(12) United States Patent
Powers et al.

(10) Patent No.: US 10,621,365 B1
(45) Date of Patent: Apr. 14, 2020

(54) OBFUSCATION FOR HIGH-PERFORMANCE COMPUTING SYSTEMS

(71) Applicant: Architecture Technology Corporation, Minneapolis, MN (US)

(72) Inventors: Judson Powers, Ithaca, NY (US); Robert A. Joyce, Ithaca, NY (US); Scott Aloisio, Ithaca, NY (US); Matthew A. Stillerman, Ithaca, NY (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 395 days.

(21) Appl. No.: 15/601,169

(22) Filed: May 22, 2017

(51) Int. Cl.
*G06F 11/30* (2006.01)
*G06F 21/60* (2013.01)
*G06F 21/62* (2013.01)
*G06F 21/52* (2013.01)
*H04L 9/12* (2006.01)

(52) U.S. Cl.
CPC ............ *G06F 21/602* (2013.01); *G06F 21/60* (2013.01); *G06F 21/52* (2013.01); *G06F 21/6254* (2013.01); *G06F 2221/2107* (2013.01); *H04L 9/12* (2013.01)

(58) Field of Classification Search
CPC ........ G06F 21/52; G06F 21/60; G06F 21/602; G06F 21/6254; G06F 2221/2107; H04L 9/12
USPC ......................................................... 713/187
See application file for complete search history.

(56) References Cited

U.S. PATENT DOCUMENTS

| | | | |
|---|---|---|---|
| 10,127,238 B1 * | 11/2018 | Bent ..................... | G06F 16/148 |
| 10,299,114 B1 * | 5/2019 | Stevens ................ | H04L 9/0891 |
| 2014/0122866 A1 * | 5/2014 | Haeger ................ | H04L 63/061 |
| | | | 713/153 |
| 2015/0207626 A1 * | 7/2015 | Neftel .................... | G08C 17/02 |
| | | | 713/168 |

(Continued)

OTHER PUBLICATIONS

Morris Lette, "SLURM: Simple Linux Utility for Resource Management" UCRL-MA-147996 REV 3, Jun. 23, 2003 (Year: 2003).*

(Continued)

*Primary Examiner* — Samson B Lemma
(74) *Attorney, Agent, or Firm* — Shumaker & Sieffert, P.A.

(57) ABSTRACT

An example method includes initializing, by an obfuscation computing system, communications with nodes in a distributed computing platform, the nodes including one or more compute nodes and a controller node, and performing at least one of: (a) code-level obfuscation for the distributed computing platform to obfuscate interactions between an external user computing system and the nodes, wherein performing the code-level obfuscation comprises obfuscating data associated with one or more commands provided by the user computing system and sending one or more obfuscated commands to at least one of the nodes in the distributed computing platform; or (b) system-level obfuscation for the distributed computing platform, wherein performing the system-level obfuscation comprises at least one of obfuscating system management tasks that are performed to manage the nodes or obfuscating network traffic data that is exchanged between the nodes.

28 Claims, 5 Drawing Sheets

(56) References Cited

U.S. PATENT DOCUMENTS

2015/0288777 A1* 10/2015 Yalozo ............... H04L 67/28
709/202

OTHER PUBLICATIONS

Andy B. Yoo "SLURM: Simple Linux Utility for Resource Management", pp. 44-60, Lawrence Livermore National Laboratory, (2003).*

Wikipedia, Slurm Workload Manager, Retrieved on Mar. 2, 2017 from http://en.wikipedia.org/wiki/Slurm_Workload_Manager, Last modified Feb. 10, 2017, 4 pgs.

Slurm Workload Manager, Quick Start User Guide, Retrieved on Mar. 2, 2017 from http://slurm.schedmd.com/quickstart.html, Last modified Mar. 31, 2016, 11 pgs.

* cited by examiner

OBFUSCATION FOR HIGH-PERFORMANCE COMPUTING SYSTEMS

STATEMENT REGARDING FEDERALLY SPONSORED RESEARCH OR DEVELOPMENT

This invention was made with government support under Contract No. DE-SC0017195 awarded by the Department of Energy. The government has certain rights in this invention.

BACKGROUND

General purpose, large-scale high-performance computing (HPC) systems are finding wider adoption with the increasing demands for computing power among business, utility, financial, education, scientific, national, and other infrastructure systems. With more general usage, the need for increased availability in such HPC systems has brought forth increased cyber security concerns. The sharing of HPC resources among increasingly unrelated users, as well as the critical nature of certain infrastructure-related applications, are often the cause of these security concerns. Other complicating factors, often prevalent with the use of HPC systems, are the larger variety of principals that could pose a threat and the larger attack surface inherent in distributed and shared computations.

For example, insiders, outsiders, co-tenancy entities, HPC infrastructure vendors and staff, software vendors/lessors, and/or data vendors/lessors are examples of principals that could pose threats. As a result, users and system maintainers of HPC systems need to account not only for external security concerns, but also security concerns that may originate from local threats. The attack surface in distributed and shared computations may include data in motion between distributed components, as well as partial or intermediate results that often end up in quasi-persistent storage. The attack surface may also include any orchestration components or any services provided by an HPC supplier, including management interfaces.

Furthermore, many applications must consider security even if they do not necessarily pertain to "national" critical infrastructure, or even infrastructure that is critical to an enterprise. In addition, stakeholders could be using HPC systems for a variety of purposes (e.g., planning, operations, development/testing/maintenance of HPC codes), which modulates the above-described concerns.

SUMMARY

In one example, a method includes initializing, by an obfuscation computing system, communications with a plurality of nodes in a distributed computing platform, wherein the plurality of nodes includes one or more compute nodes that provide one or more resources in the distributed computing platform, wherein the plurality of nodes further includes a controller node that performs resource management of the one or more resources in the distributed computing platform, and wherein the obfuscation computing system serves as an intermediary between the controller node and the one or more compute nodes. The method further includes performing, by the obfuscation computing system, at least one of (a) code-level obfuscation to obfuscate interactions between a user computing system and the plurality of nodes, or (b) system-level obfuscation for the distributed computing platform. Performing the code-level obfuscation comprises obfuscating data associated with one or more commands provided by the user computing system to generate one or more obfuscated commands, and sending the one or more obfuscated commands to at least one of the plurality of nodes in the distributed computing platform. Performing the system-level obfuscation comprises at least one of obfuscating system management tasks that are performed to manage the plurality of nodes or obfuscating network traffic data that is exchanged between the plurality of nodes.

In one example, a computing system includes one or more processors and one or more non-transitory computer-readable storage media. The one or more non-transitory computer-readable storage media store instructions that, when executed, cause the one or more processors to initialize communications with a plurality of nodes in a distributed computing platform, wherein the plurality of nodes includes one or more compute nodes that provide one or more resources in the distributed computing platform, wherein the plurality of nodes further includes a controller node that performs resource management of the one or more resources in the distributed computing platform, and wherein the computing system serves as an intermediary between the controller node and the one or more compute nodes. The instructions stored by the non-transitory computer-readable storage medium further cause the one or more processors to perform at least one of (a) code-level obfuscation for the distributed computing platform to obfuscate interactions between a user computing system and the plurality of nodes, or (b) system-level obfuscation for the distributed computing platform. Performing the code-level obfuscation comprises obfuscating data associated with one or more commands provided by the user computing system to generate one or more obfuscated commands, and sending the one or more obfuscated commands to at least one of the plurality of nodes in the distributed computing platform. Performing the system-level obfuscation comprises at least one of obfuscating system management tasks that are performed to manage the plurality of nodes or obfuscating network traffic data that is exchanged between the plurality of nodes.

In one example, a non-transitory computer-readable storage medium stores instructions that, when executed, cause a computing system to perform operations that include initializing communications with a plurality of nodes in a distributed computing platform, wherein the plurality of nodes includes one or more compute nodes that provide one or more resources in the distributed computing platform, wherein the plurality of nodes further includes a controller node that performs resource management of the one or more resources in the distributed computing platform, and wherein the computing system serves as an intermediary between the controller node and the one or more compute nodes. The operations further include performing at least one of (a) code-level obfuscation for the distributed computing platform to obfuscate interactions between a user computing system and the plurality of nodes, or (b) performing system-level obfuscation for the distributed computing platform. Performing the code-level obfuscation comprises obfuscating data associated with one or more commands provided by the user computing system to generate one or more obfuscated commands, and sending the one or more obfuscated commands to at least one of the plurality of nodes in the distributed computing platform. Performing the system-level obfuscation comprises at least one of obfuscating system management tasks that are performed to manage the plurality of nodes or obfuscating network traffic data that is exchanged between the plurality of nodes.

The details of one or more examples are set forth in the accompanying drawings and the description below. Other features, objects, and advantages of the disclosure will be apparent from the description and drawings, and from the claims.

DETAILED DESCRIPTION

Figure 1:
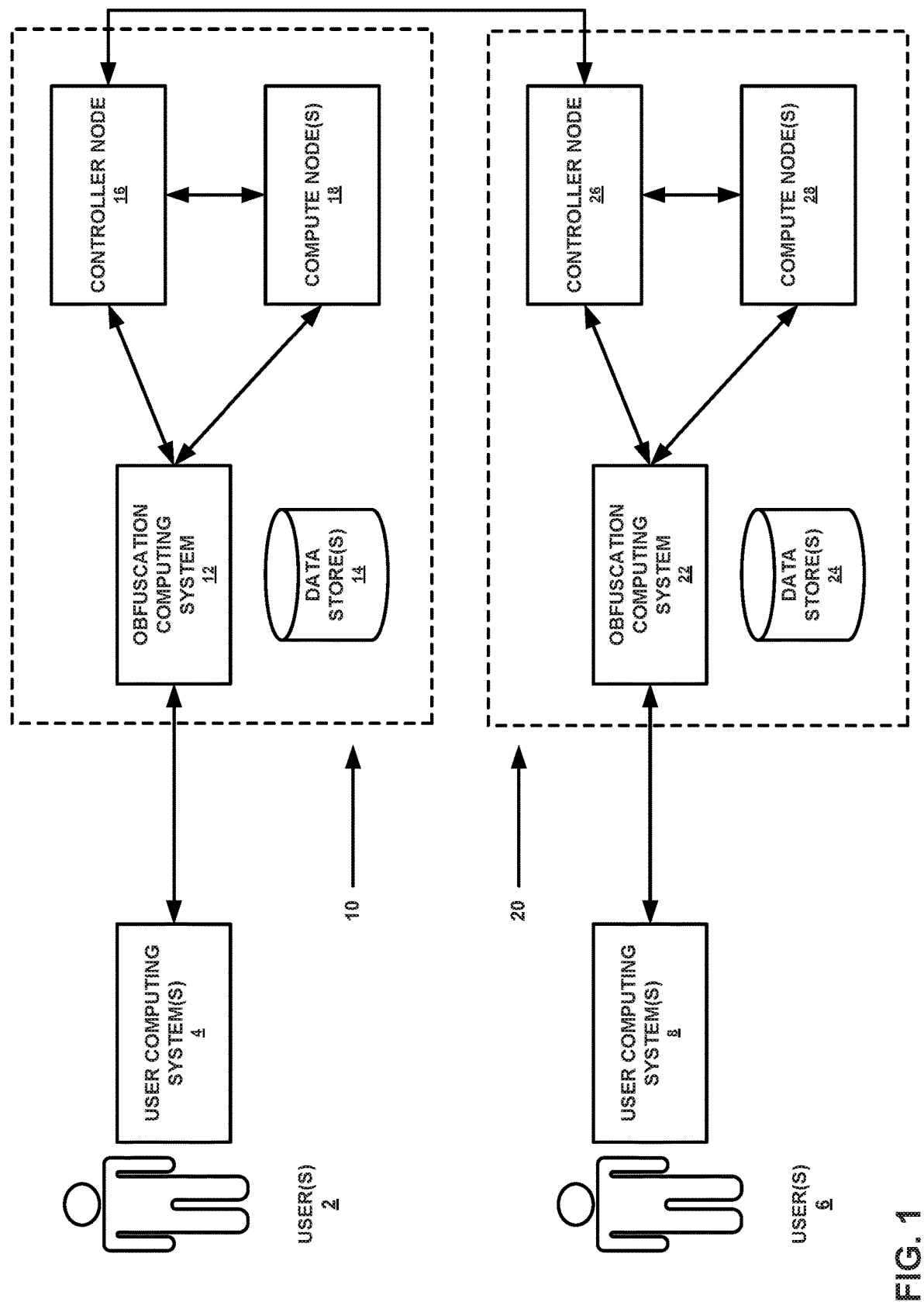
FIG. 1 is a block diagram illustrating example user computing systems and example computing platforms, in accordance with one or more aspects of the present disclosure.

As noted above, the increased use of general purpose, large-scale high-performance computing (HPC) systems has resulted in increased cyber security concerns. Users and system maintainers of HPC systems need to account not only for external but also local security concerns. Thus, instead of focusing entirely on external risks, secure HPC systems typically must also handle data in a way that enforces data confidentiality among unrelated users of the same system.

Additionally, along with the commodification of HPC resources comes a need to maintain privacy for users on the same system. For example, HPC commands and associated data may contain corporate secrets, sensitive financial information, or political activities and intelligence strategies, to name only a few examples. In some cases, even in a properly secured cluster, metadata from running processes may leak potentially sensitive information. Ideally, unprivileged users would not be able to obtain any information or metadata surrounding the activities of other users.

In many cases, a goal of HPC cybersecurity is to ensure that computational integrity and data confidentiality is maintained. HPC calculations frequently depend on networked instruments, time-critical data, and interactive components. Due to the highly networked and heterogeneous nature of HPC systems, security vulnerabilities can impact computational integrity from many different angles. Potential risks include vulnerable user code, improperly configured system managers or operating systems, or inherent limitations of HPC resource management systems. Traditional data encryption can mitigate these risks, but it ultimately may cause considerable computational overhead.

According to one or more techniques of the present disclosure, a software system for use with or in an HPC system may perform various security operations, including obfuscation and monitoring operations. The software system may, for example, obfuscate the operations of an HPC cluster, protecting data confidentiality and integrity. Code-level obfuscation refers to the deliberate act of creating information (e.g., computer code) that is difficult for humans to understand, without necessarily changing the core functionality associated with such information. Code obfuscation is a technique that may be used to deter reverse engineering of machine code. The act of obfuscating user-submitted code may raise the bar for any malicious entity trying to snoop on the activities of users. In addition to data and code-level obfuscation, the software system disclosed herein also introduces system and/or network-level obfuscation. By obfuscating not only HPC codes but also status information, system data, network data, configuration information, and the like, sensitive operations can be hidden from underprivileged users without necessarily imparting significant computational overhead. In certain examples, the software system comprises a software service that combines or interfaces with the plugins application programming interface (API) of HPC management frameworks (e.g., Simple Linux Utility for Resource Management Workload Manager, or SLURM) to provide, among other things, obfuscation and improved monitoring for privileged users.

According to one or more techniques, the disclosed software system aims to make data snooping, interception, and modification prohibitively difficult for unauthorized users, such that users in a shared HPC environment can have a greater assurance of data integrity and confidentiality. More specifically, in some non-limiting examples, the software system may comprise a software service that runs primarily alongside the central management process(es) on the cluster's master node, acting as an intermediary between user interactions and system behavior. The software system may be capable of wrapping user commands and/or system management tasks, allowing cluster behavior to be modified, HPC codes to be obfuscated, and improved system monitoring to be implemented. Thus, in some examples, user interaction and system management tasks may be silently controlled by processes that run as part of, or alongside, the resource management system on an HPC cluster.

Not only does this allow for potentially more selective use of resources on the cluster, but also allows for obfuscation of interactions between nodes in the cluster. In addition, improved feedback and monitoring tools may also enable system maintainers to monitor potentially suspicious activities and permit enhanced transparency for privileged users. Data security assurances on HPC systems may lead to benefits for the general public. For example, users may not have to worry about their data or algorithms being exposed to other users, meaning that organizations can move sensitive computations to shared HPC systems, thereby saving money and increasing computational efficiency. System maintainers can make better use of HPC resources by leasing cycles to unrelated users. Furthermore, computational integrity can be maintained by providing a more consistent and secure environment.

FIG. 1 is a block diagram illustrating example user computing systems and example computing platforms, in accordance with one or more aspects of the present disclosure. In the example of FIG. 1, one or more users 2 may utilize one or more user computing systems 4 to interact with computing platform 10. Similarly, one or more users 6 may utilize one or more user computing systems 8 to interact with computing platform 20.

In some cases, users 2 and 6 may be end users of computing platforms 10 and 20, respectively. In other cases, users 2 and 6 may be administrators or maintainers of computing platforms 10 and 20, respectively. Each of user computing systems 4 and 6 may comprise a desktop computing device, a mobile computing device (e.g., mobile phone, tablet computer, personal digital assistant (PDA), laptop computer, wearable computing device), or other type of computing device. Each of user computing systems 4 and 6 may include one or more processors and include, or be otherwise coupled to, one or more display devices. User computing systems 4 and 6, as well as computing platforms 10 and 20, may each include one or more communication units, which are configured to send and receive data. In some examples, these communication units support wireless and/ or wired communication and may send and/or receive data using any variety of communication protocols.

Each of computing platforms 10 and 20 may include various resources, including one or more computing nodes. For example, as shown in FIG. 1, computing platform 10 includes an obfuscation computing system 12 (which will be described in further detail below), a controller node 16, one or more compute nodes 18, and one or more data stores 14. Controller node 16 may include one or more computing systems. Each of compute nodes 18 may include one or more computing systems. Data stores 14 may store information that is used by and in computing platform 10, and is accessible to each of obfuscation computing system 12, controller node 16, and compute nodes 18.

As will be described in further detail below, obfuscation computing system 12 may be configured to obfuscate information that is sent to controller node 16 and/or compute nodes 18, and also to receive obfuscated information from controller node 16 and/or compute nodes 18. In some cases, obfuscation computing system 12 may receive information from user computing systems 4, such as user commands and/or data, and obfuscate at least some of the received information prior to sending it to controller node 16 and/or compute nodes 18. Upon receiving obfuscated response information (e.g., obfuscated command response data) back from controller node 16 and/or compute nodes 18, obfuscation computing system 12 may transform, or deobfuscate, at least some of the obfuscated response information into a non-obfuscated form prior to sending it back to user computing system 4.

Computing platform 20 may include resources similar to those included in computing platform 10. For example, as shown in FIG. 1, computing platform 20 includes an obfuscation computing system 22, a controller node 26, one or more compute nodes 28, and one or more data stores 24. In some examples, each of computing platforms 10 and 20 may comprise HPC computing clusters. HPC computing clusters are, in many cases, distributed platforms having resources that are communicatively coupled with one another (e.g., via one or more networks). In some examples, each of computing platforms 10 and 20 may comprise distributed cloud platforms or systems. Additionally, as shown in the particular example of FIG. 1, computing platform 10 may be communicatively coupled to computing platform 20. For instance, controller node 16 of computing platform 10 may, in some cases, communicate with controller node 26 of computing platform 20.

In various examples, obfuscation computing system 12 may provide a framework for both code-level and system-level obfuscation that support many different obfuscation techniques. In some cases, obfuscation computing system 12 may change the behavior of a task scheduler, the interconnect networking fabric, and/or authenticator implemented by controller node 16 and/or compute nodes 18 in computing platform 10, such that computing platform 10 may behave in unpredictable ways. In these cases, metadata that may compromise the security of a user computing platform 10 may be masked. By providing an intermediate control source, obfuscation computing system 12 may obtain a granular control over processes, process interactions, and resource allocation in computing platform 10. During execution, obfuscation computing system 12 may act as an intermediate redirection layer between controller node 16 and compute nodes 18. By redirecting resource allocation tasks back through obfuscation computing system 12, computing platform 10 may, as one non-limiting example, be able to implement randomization techniques on compute resources. Obfuscation 22 may provide similar functionality with respect to computing platform 20.

Furthermore, in addition to providing system-level obfuscation functionality, obfuscation computing systems 12 and 22 may also provide code-level obfuscation functionality. For example, in some examples, obfuscation computing system 12 may respond to user commands from user computing systems 4. As will be described in more detail below, obfuscation computing system 12 may obfuscate input data for these commands before passing the obfuscated data on to controller node 16 and/or compute nodes 18. Obfuscation computing system 12 may then deobfuscate received, obfuscated response data from controller node 16 and/or compute nodes 18 (e.g., via translation or transformation) before sending responses back to user computing systems 4. In general, each of obfuscation computing systems 12 and 22 may be configured to obfuscate codes, data inputs, data outputs, and intermediate results processed within respective computing platforms 10 and 20, making it more difficult for potential attackers to gain access to protected data. In examples when obfuscation computing systems 12 and/or 22 perform code obfuscation, obfuscation computing system 12 may obfuscate user codes by transforming input binaries or commands, received from user computing systems 4, into obfuscated binaries or commands that are processed by controller node 16 and/or compute nodes 18. Similarly, obfuscation computing system 22 may obfuscate user codes by transforming input binary codes or commands, received from user computing systems 8, into obfuscated binary codes or commands processed by controller node 26 and/or compute nodes 28.

In many instances, it is common for HPC codes or commands to require large datasets as inputs, which may contain private or proprietary information. To protect such information, obfuscation computing systems 12 and 22 may implement one or more transformation (e.g., encryption) techniques to transform the input data into unreadable or misleading (e.g., obfuscated) data, and then use obfuscated code to operate directly on the encrypted data. For example, a bank may have a dataset filled with customer savings values. In a non-limiting case, obfuscation computing system 12 or 22 could apply a known transformation to account balances for storage, and later introduce a complementary transformation step when computations take place. By using, in certain examples, homomorphic encryption scheme on data that is used with obfuscated code, it is possible for controller node 16 and/or computing nodes 18 in computing platform 10, as well as for controller node 26 and/or compute nodes 28 of computing platform 20, to operate on data that has been obfuscated. Using obfuscation as a weak form of encryption may impart, in some examples, a lower computational cost than strong encryption, while still providing protection for proprietary data.

Thus, in some examples, one or more of the obfuscation computing systems, such as obfuscation computing system 12, may initialize communications with nodes in distributed computing platform 10. These nodes include compute nodes 18, which provide one or more resources in computing platform 10, and also controller node 16, which performs resource management of the one or more resources in computing platform 10. Obfuscation computing system 12 serves as an intermediary between controller node 16 and compute nodes 18.

Obfuscation computing system 12 is configured to perform at least one of (a) code-level obfuscation for computing platform 10 to obfuscate interactions between user computing systems 4 and nodes 16, 18, or (b) system-level obfuscation for computing platform 10. User computing systems 4 may, in the non-limiting example of FIG. 1, be external to computing platform 10. (In some other cases, user computing systems 4 may be included in computing platform 10.) Obfuscation computing system 12 may perform the code-level obfuscation at least by obfuscating data associated with one or more commands provided by user computing systems 4 to generate one or more obfuscated commands, and sending the one or more obfuscated commands to at least one of nodes 16, 18.

Obfuscation computing system 12 may, in some cases, be configured to perform system-level obfuscation in computing platform 10. Obfuscation computing system 12 may be configured to performing the system-level obfuscation at least by obfuscating system management tasks that are performed to manage nodes 16, 18, and/or by obfuscating network traffic data that is exchanged between nodes 16, 18. Furthermore, obfuscation computing system 22 may be configured to perform similar operations with respect to nodes 26, 28 in computing platform 20, which interacts with user computing systems 8.

Figure 2:
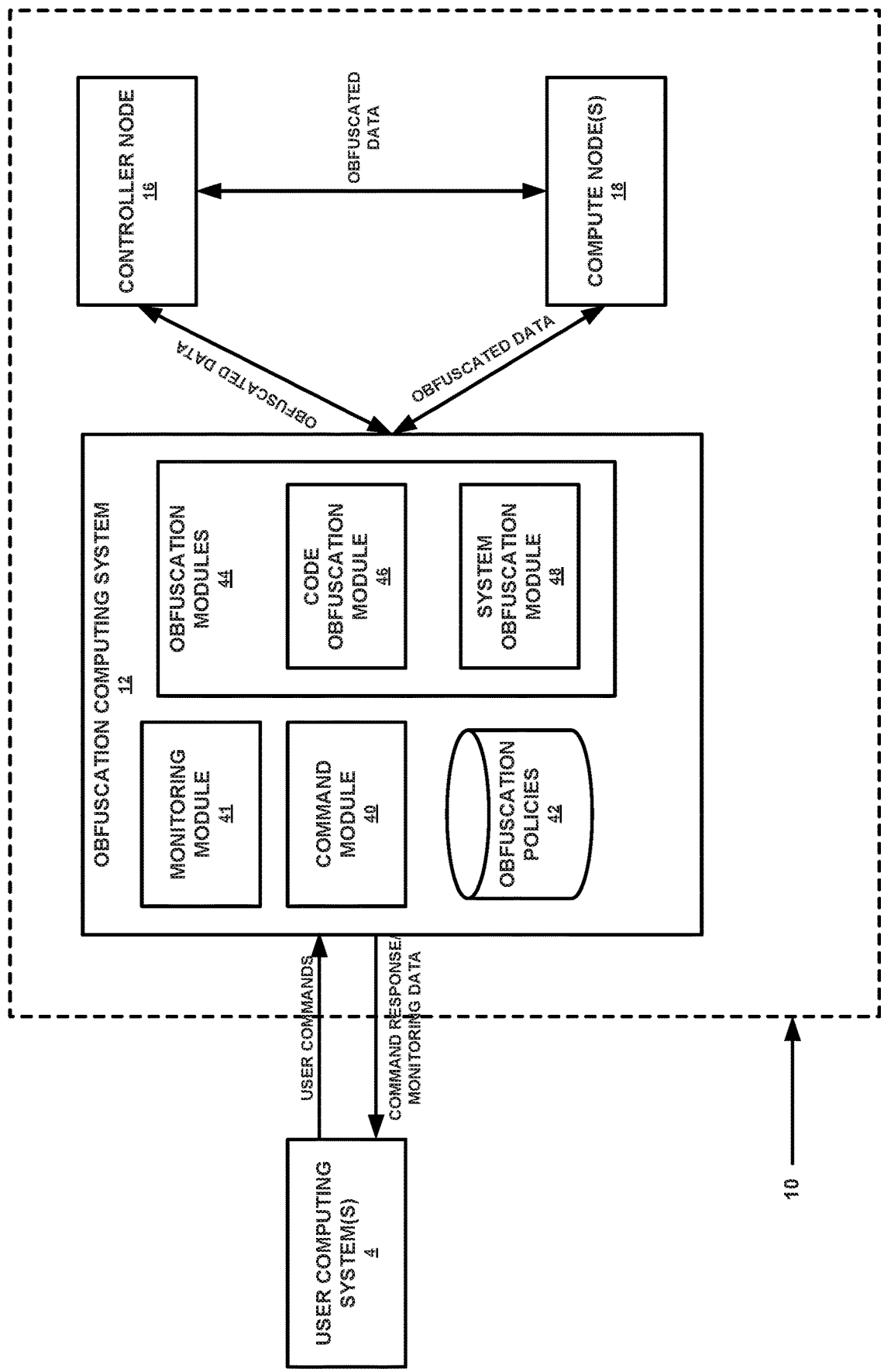
FIG. 2 is a block diagram illustrating further example details of one of the computing platforms shown in FIG. 1, in accordance with one or more aspects of the present disclosure.

FIG. 2 is a block diagram illustrating example further details of computing platform 10 shown in FIG. 1, in accordance with one or more aspects of the present disclosure. As shown in FIG. 2, computing platform 10 may receive user commands from user computing systems 4, and may send command response and/or monitoring data back to user computing systems 4.

Computing platform 10 includes obfuscation computing system 12 (hereinafter referred to as "obfuscation system 12") controller node 16, and one or more compute nodes 18. Obfuscation system 12 may send obfuscated data, including obfuscated command data, to controller node 16 and/or compute nodes 18. Obfuscation system 12 may also receive obfuscated data, including obfuscated response data, from controller node 16 and/or compute nodes 18. In addition, controller node 16 and compute nodes 18 may exchange obfuscated data.

As shown in FIG. 2, obfuscation system 12 includes a command module 40, a monitoring module 41, obfuscation policies 42, and obfuscation modules 44. Command module 40 is configured to manage commands and associated command data that are processed by obfuscation system 12. For example, command module 40 may process incoming commands that are received from user computing systems 4. Command module 40 may then provide commands and associated command data to obfuscation modules 44. Upon receiving deobfuscated command response data back from obfuscation modules 44 (e.g., after controller node 16 and/or compute nodes 18 have processed obfuscated commands and/or data, which are deobfuscated by obfuscated modules 44), command module 40 may provide the deobfuscated command response data back to user computing systems 4.

Obfuscation modules 44 may provide both code-level and system-level obfuscation functionality. For example, obfuscation modules 44 include a code obfuscation module 46 and a system obfuscation module 48. Code obfuscation module 46 may obfuscate codes or commands received from command module 40. In addition, code obfuscation module 46 may obfuscate any data (e.g., input data, output data) associated with these codes or commands. Code obfuscation module 46 may send obfuscated code and/or command data to controller node 16 and/or compute nodes 18, and may also subsequently receive obfuscated response data. In such fashion, controller node 16 and compute nodes 18 do not process the same codes, commands, and/or data provided by command module 40 or received from user computing systems 4. Instead, controller node 16 and compute nodes 18 process obfuscated data that is more difficult to discern, or that is even misleading, to any individuals or entities attempting to analyze or decipher the data being sent to or processed by controller node 16 and/or compute nodes 18.

As described previously, in some cases, code obfuscation module 46 may obfuscate data that is associated with a code or command, such as input or output data. In some cases, code obfuscation module 46 may implement one or more encryption techniques (e.g., homomorphic encryption techniques) to transform input data into obfuscated (e.g., unreadable or misleading) data. Code obfuscation module 46 may or may not obfuscate the actual command that is received from command module 40. Code obfuscation module 46 may then pass the command, either in original or obfuscated form, along with the obfuscated input data, to controller node 16 and/or compute nodes 18. Code obfuscation module 46 may be configured to modify how a command is compiled or otherwise interpreted for execution in computing platform 10, and/or may change the binary version of the command that is executed. Similarly, code obfuscation module 46 may be configured to modify the input and/or output data associated with a command or code, such as described above.

Upon receiving obfuscated response data from controller node 16 and/or compute nodes 18, obfuscation module 46 may be configured, in some cases, to deobfuscate the code or command, if obfuscation modules 44 previously had obfuscated the original code or command provided by command module 40. Obfuscation module 46 may also be configured to deobfuscate the data (e.g., output data) associated with the code or command, which may have been generated or otherwise provided by controller node 16 and/or compute nodes 18 based on the obfuscated command previously received from code obfuscation module 46. Upon deobfuscating any associated information received from controller node 16 and/or compute nodes 18, code obfuscation module 46 may provide deobfuscated response data, which may include any deobfuscated data, back to command module 40. Command module 40 may provide command response data back to user computing systems 4. The command response data provided back to user computing systems 4 does not include any obfuscated information.

As will be described in even further detail below, system obfuscation module 48 may also provide system-level obfuscation functionality. In some cases, system obfuscation module 48 may change or alter the behavior of various system-level functions (e.g., task scheduling, networking/interconnections, resource selection, logging, authentication) to behave in unpredictable ways. For instance, system obfuscation module 48 may mask metadata that may compromise the security of the user. By serving as an intermediate control source between user computing systems 4 and nodes 16, 18, obfuscation system 12 may be configured to provide granular control over processes executed by nodes 16, 18, interactions between such processes, and the mechanisms by which resources are allocated. Obfuscation system 12 may use code obfuscation module 46 to process user commands provided via command module 40 from user computing systems 4. In addition, it may also provide system-level obfuscation via system obfuscation module 48. As a result, obfuscation system 12 may act as an intermediate redirection layer for command processing and system-level tasks. For instance, as one non-limiting example, with respect to system-level tasks, obfuscation system 12 may act as an intermediate redirection layer for resource allocation tasks, such that obfuscation system 12 may implement various techniques (e.g., randomization techniques) on computing resources (e.g., resources provided by one or more of compute nodes 18) of computing platform 10.

Obfuscation system 12 may utilize one or more obfuscation policies 42 during execution of obfuscation modules 44. Obfuscation policies 42 may include one or more policies associated with code-level obfuscation functionality (e.g., policies associated with command data encryption or decryption). Code obfuscation module 46 may utilize these ones of obfuscation policies 42 to implement its code-level functionality. Obfuscation policies 42 may also include one or more different policies associated with system obfuscation-level functionality (e.g., policies associated with task scheduling, networking/interconnections, resource selection, logging, and/or authentication). System obfuscation module 48 may utilize these ones of obfuscation policies 42 to implement its system-level obfuscation functionality. Obfuscation policies 42 are customizable and may be modified by, e.g., an administrator of computing platform 10, to change the operational behavior of obfuscation modules 44.

Furthermore, as shown in FIG. 2, obfuscation system 12 may also provide monitoring data, provided by monitoring module 41, back to user computing systems 4. This monitoring data may include monitoring information gathered and/or generated by computing platform 10. In some cases, the monitoring information may include system performance and other diagnostic information associated with computing platform 10 (e.g., performance or diagnostics associated with controller node 16 and/or compute nodes 18). User computing systems 4 may utilize such monitoring information to monitor the activities of computing platform 10. In some cases, the monitoring information may further include information associated with execution of obfuscation modules 44 during allocation of resources in computing platform 10 and/or execution of tasks by nodes 16, 18.

This monitoring data may also include information associated with obfuscation policies 42 that are used by obfuscation modules 44. Such monitoring information may only be available to certain privileged or authorized users of user computing systems 4 or computing platform 10, according to certain examples. In some cases, user computing systems 4 may provide a visualization tool that outputs the monitoring data received from computing platform 10, as well as, in certain instances, providing functionality to monitor and manage computing platform 10 based on the monitoring data received from obfuscation system 12 (e.g., to modify obfuscation policies 42 by a privileged or authorized user). For example, a privileged or authorized user may use such a visualization tool to view and/or update the code-level obfuscation policies included in policies 42 to modify the run-time behavior of code obfuscation module 36 in computing platform 10. Such a user may also use such a tool to view and/or update the system-level obfuscation policies includes in policies 42 to modify the run-time behavior of system obfuscation module 48.

Figure 3:
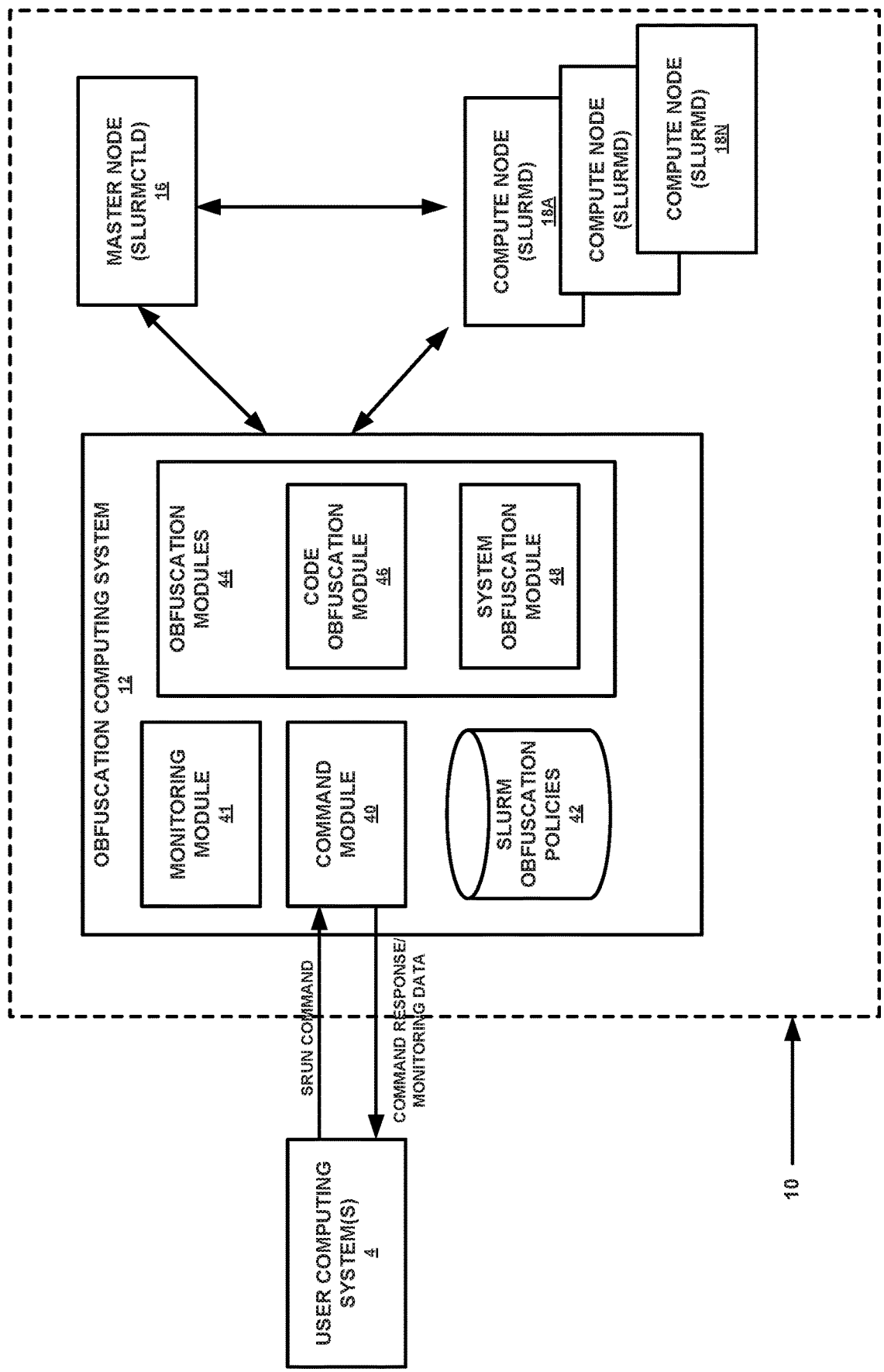
FIG. 3 is a block diagram illustrating one example of the computing platform shown in FIG. 2, in accordance with one or more aspects of the present disclosure.

FIG. 3 is a block diagram illustration one example of computing platform 10 shown in FIG. 2, in accordance with one or more aspects of the present disclosure. In the non-limiting example of FIG. 3, computing platform 10 implements the Simple Linux Utility for Resource Management, or SLURM, workload management system, which is shown for illustration purposes only. In this example, computing platform 10 may comprise a high-performance computing cluster (hereinafter "HPC cluster 10" in reference to FIG. 3), where controller node 16 is a master node (SLURMCTLD) (hereinafter "master node 16" in reference to FIG. 3) that serves as a resource manager in HPC cluster 10. HPC cluster 10 may comprise a highly distributed system of resources (e.g., resources provided by compute nodes 18), which provides high bandwidth and supports high volumes of network traffic.

Compute nodes 18 of this HPC cluster 10 are compute nodes (SLURMD's) 18A-18N (hereinafter "compute nodes 18" in reference to FIG. 3) that serve as or otherwise provide resources in HPC cluster 10. HPC cluster 10 may allocate exclusive and/or non-exclusive access to compute nodes 18 for some duration of time, and may provide a framework for starting, executing, and/or monitoring work on a set of allocated nodes. HPC cluster 10 may also arbitrate contention for resources by managing a queue of pending jobs. As shown in the example of FIG. 3, obfuscation policies 42 may comprise SLURM obfuscation policies that are used by obfuscation modules 44 during implementation of SLURM by HPC cluster 10. SLURM is built for extensibility, allowing extra features to be added without having to account for significant extra development overhead.

As illustrated in FIG. 3, all interactions between user computing systems 4 and processes executing on master node 16 and/or compute nodes 18 pass through obfuscation system 12. In this way, obfuscation system 12 may act as a wrapper for SLURM behaviors and responses. In addition, obfuscation system 12 may also act as an intermediary between master node 16 and compute nodes 18. Obfuscation module 44 includes code obfuscation module 46 and system obfuscation module 48. In the example of FIG. 3, and similar to the example of FIG. 2, code obfuscation module 46 provides code-level obfuscation functionality, while system obfuscation module 48 provides system-level obfuscation functionality.

Obfuscation system 12 uses command module 40 to intercept commands from user computing systems 4 and instructs corresponding ones of nodes 16 and/or 18 to respond. To prevent users from snooping directly on the activities of nodes 16 and/or 18, obfuscation system 12 also is configured to obfuscate system behavior (e.g., using system obfuscation module 48). Thus, obfuscation system 12 may fit within the plugin architecture of SLURM to reconfigure or modify the runtime operation of SLURM in HPC cluster 10.

Command module 40 acts as an interface between user computing systems 4 and the underlying system resources (e.g., resources of compute nodes 18) in HPC cluster 10. Users of user computing system 4 may issue commands that are then routed to command module 40 of obfuscation system 12. Command module 40 provides the commands to code obfuscation module 46 of obfuscation modules 44, which augments the commands with obfuscation procedures before passing them on to the master node 16 and/or compute nodes 18. Responses to user commands may, in some cases, be obfuscated to return absent or misleading information from master node 16 and/or compute nodes 18 back to code obfuscation module 46. Code obfuscation module 46 may obfuscate commands or code (e.g., message passing interface (MPI) code), data inputs associated with such commands or code, data outputs associated with execution of the commands or code, and/or any intermediate results on the cluster. In some cases, code obfuscation module 46 may transform input binaries into obfuscated binaries. Obfuscating these interfaces raises the bar for attackers wishing to read protected data in HPC cluster 10.

In many cases, it is common for HPC commands or codes to have large datasets as inputs. Large datasets often contain private or proprietary information. To protect such information in these datasets, code obfuscation module 46 may, in various examples, implement simple encryption techniques to transform data (e.g., input data for commands) into obfuscated data, which may be unreadable and/or misleading, and then pass the obfuscated commands (which include or are otherwise associated with the obfuscated data) to master node 16 and/or compute nodes 18, which may then use the obfuscated commands to operate directly on the encrypted data. For example, a bank may have a dataset filled with customer savings values. In a non-limiting example, code obfuscation module 46 may apply a known transformation (e.g., encryption) to account balances for storage in HPC cluster 10, and later introduce a complementary transformation step when computations on the encrypted account balance data take place. Code obfuscation module 46 may subsequently decrypt the encrypted account balance data (e.g., when providing such decrypted account balance data to a user, such as user 2 or user 6). By using a simple homomorphic encryption scheme with obfuscated code, it becomes possible to operate on data that has been obfuscated. In some cases, using obfuscation as a weak form of encryption may impart a potentially lower computational cost than strong encryption while still providing protection for proprietary data.

In a particular yet non-limiting use case, one of user computing systems 4 may send an "srun" SLURM command to command module 40, which is one example of an HPC code. Command module 40 and/or code obfuscation module 46 may provide a command line interface (CLI) for interpreting user commands, such as the "srun" command. The CLI may act as a software layer between the user's intent and the actions of the nodes (e.g., master node 16, compute nodes 18) of HPC cluster 10. The "srun" command is a command to execute a parallel job in HPC cluster 10. The "srun" command is a command that prompts SLURM to allocate resources and run a command or script. Instead of communicating directly with master node 16, the "srun" command is passed through code obfuscation module 46 before being provisioned and run. By building an interface between SLURM behavior and the user, implemented by obfuscation system 12, it becomes possible to not only control how information flows once it reaches master node 16 and/or compute nodes 18, but also how information is displayed to a user (e.g., a user of user computing systems 40).

The "srun" command, similar to many other SLURM commands, may have various parameter values (e.g., options) that are specified by user computing systems 4. The values of these parameters may be associated with information about the particular "srun" command, such as information about the job to be run, how much memory to allocate, what kind and/or number of systems/nodes/resources to allocate, and the like. Some of the "srun" options or parameter values may be set via environment variables.

When command module 40 receives the "srun" command from user computing systems 4, command module 40 provides the "srun" command, along with any of the parameter values (e.g., input data), to code obfuscation module 46 of obfuscation modules 44. Code obfuscation module 46 receives the "srun" command as input and passes on an obfuscated version of the "srun" command to the HPC system comprising master node 16 and compute nodes 18. In some examples, code obfuscation module 46 may translate the received "srun" command into an obfuscated "srun" command that is executable by master node 16 and/or compute nodes 18.

While the obfuscated "srun" command generated by code obfuscation module 46 may still appear to an interpreted by nodes 16, 18 as an "srun" command, the obfuscated "srun" command may have a different format and/or or have different input parameter values than the original "srun" command received from command module 40. For example, if the original "srun" command had two specific input parameter values, code obfuscation module 46 may obfuscate these input parameter values to generate an obfuscated "srun" command that has one or more different, obfuscated input parameter values as compared to the parameter values included in the original "sum" command. Code obfuscation module 46 may use obfuscation policies 42 to determine how to obfuscate the input parameter values. Obfuscation policies 42 are also customizable, such that the way in which code obfuscation module 46 obfuscates the exact same command or data may be different depending on the rules specified by obfuscation policies 42.

Thus, in the example of FIG. 3, code obfuscation module 46 may utilize obfuscation policies 42 to determine how to create the obfuscated "srun" command from the original "srun" command received from command module 40. For instance, obfuscation policies 42 may include a rule specifying how code obfuscation module 46 is to modify input parameter values of an "srun" command in order to generate an obfuscated "srun" command. In some cases, as described previously, and based on obfuscation policies 42, code obfuscation module 46 may encrypt the input parameter values associated with the original "srun" command to generate encrypted input parameter values for the obfuscated "srun" command.

Code obfuscation module 46 may provide this obfuscated "srun" command for execution by master node 16 and/or compute nodes 18, rather than the original "srun" command. The obfuscated "srun" command, which includes or is otherwise associated with obfuscated data (e.g., obfuscated parameter values), may be referred to as an obfuscated code. Upon execution of the obfuscated "srun" command by, such as by one or more of compute nodes 18, code obfuscation module 46 may receive obfuscated response data for the obfuscated "srun" command. This obfuscated response data may include output data associated with the obfuscated "srun" command. Prior to passing information back to command module 40, code obfuscation module 46 may, in some cases, deobfuscate the obfuscated response data. For instance, code obfuscation module 46 may utilize obfuscation policies 42 to determine how to deobfuscate the obfuscated response data. Continuing from the example above, if code obfuscation module 46 had previously generated the obfuscated "srun" command by obfuscating the input parameter values associated with the original "srun" command, code obfuscation module 46 may subsequently deobfuscate the output data included in the obfuscated response data received from, e.g., compute nodes 18.

As one example, code obfuscation module 46 may use obfuscation policies 42 to translate the obfuscated response data, including any obfuscated output data, into different output values, thereby creating deobfuscated response data. As another example, code obfuscation module 46 may use obfuscation policies 42 to decrypt any obfuscated output data received from compute nodes 18, thereby created deobfuscated response data.

In some cases, obfuscation and deobfuscation rules specified by obfuscation policies 42 may be associated with each other. For instance, if code obfuscation module 46 uses a first obfuscation rule in generating an obfuscated command (e.g., obfuscated "srun" command), code obfuscation module 46 may use a first deobfuscation rule in generating deobfuscated response data that is responsive to the obfuscated command executed by compute nodes 18, where the first deobfuscation rule (e.g., decryption rule) corresponds to the first obfuscation rule (e.g., encryption rule) that was previously used to obfuscate the incoming command data. In such fashion, obfuscation policies 42 may map certain obfuscation rules or policies to corresponding deobfuscation rules or policies that are implemented by obfuscation modules 44, including both code obfuscation module 46 and system obfuscation module 48.

The code obfuscation performed by code obfuscation module 46 not only makes debugging the HPC code more difficult, but it also changes the behavior of the code to accept obfuscated data (e.g., as input parameter values). Obfuscated data is then introduced to HPC cluster 10, allowing the obfuscated code to perform, e.g., the homomorphic equivalent of the original calculations with minimal computational overhead or impact on efficiency. Through implementation of code-level obfuscation, code obfuscation module 46 may hide user data and algorithms associated with commands being processed by master node 16 and/or compute nodes 18 from other users. This may be achieved by obfuscating user code and data before running it on the target cluster of nodes (e.g., compute nodes 18). Code obfuscation module 46 may comprise an intermediate interface between command module 40 and master node 16/compute nodes 18, which interpret user requests and passes obfuscated version of them on to one or more nodes in HPC cluster 10.

There are other potential benefits to providing an intermediate interface for SLURM actions, as provided by obfuscation system 12. Users of HPC cluster 10 (e.g., users of user computing systems 4) do not necessarily have to learn a new interface, even though the underlying behavior of their actions will change. It also becomes possible to implement stricter access controls for unprivileged users. For example, users can easily view information about resource availability by causing user computing systems 4 to send an "sinfo" SLURM command to HPC cluster 10. The standard response to a non-obfuscated "sinfo" command may provide details on specific hardware usage within HPC cluster 10, potentially indicating a class of problem that is being worked on by other users. However, through the use of obfuscation system 12, by changing, omitting, or otherwise obfuscating SLURM commands and the corresponding responses to such commands, the bar is raised for casual users trying to obtain inside information for HPC cluster 10. In addition, for others attacks on data confidentiality, obfuscation system 12 may also implement system-level obfuscation through use of system obfuscation module 48, as will be described in further detail below.

The command interpretation layer provided by command module 40 and/or code obfuscation module 46 may augment the CLI with additional monitoring commands. An important part of HPC cybersecurity is the ability to monitor system performance and gather diagnostic information about HPC cluster 10. Suspicious activities can be identified through the use of monitoring tools that have sufficient granularity. Monitoring module 41 of obfuscation system 12 may be configured to perform such monitoring and diagnostic operations. Obfuscation system 12 may act as a central source of cluster behavior, allowing a high level of diagnostic detail to be obtained.

As one example, command module 40 may implement a command that may be invoked by user computing systems 4 to provide processor usage (e.g., current, historical) across compute nodes 18 in HPC cluster 10. Command module 40 may support one or more additional commands that provide information about monitored system performance and diagnostic information for HPC cluster 10. Furthermore, command module 40 may support one or more commands associated with operation of obfuscation modules, such as code obfuscation module 46 and/or system obfuscation module 48, as well as with obfuscation policies 42. These commands may only be accessible to privileged or authorized users (e.g., administrators) of HPC cluster 10. Through the use of such commands with HPC cluster 10, a privileged or authorized user may obtain information about the status and operation associated with obfuscation modules 44. In addition, the user may use such commands to view and/or modify the rules or policies contained in obfuscation policies 42, which are used by obfuscation modules 44 during operation. In such fashion, a privileged or authorized user may effectively modify the operation of obfuscation modules 44 during execution of commands or transport of data within HPC cluster 10.

As shown in FIG. 3, obfuscation modules 44 also includes system obfuscation module 48. System obfuscation module 48 provides system-level obfuscation for HPC cluster 10. System obfuscation module 48 may be configured to obfuscate system data and network configuration and/or traffic data, among other things. In such fashion, system obfuscation module 48 may, in some cases, control the configuration of and data flow through HPC cluster 10, including master node 16 and compute nodes 18, and may alter the behavior of HPC cluster 10 on a system-wide basis. By obfuscating system-level and/or configuration-level information, system obfuscation module 48 may obfuscate interactions between nodes, such as mater node 16 and/or compute nodes 18, and effectively restrict user access to any computational metadata in HPC cluster 10 while potentially having minimal-to-no impact on computational efficiency within HCP cluster 10.

Within the context of the non-limiting example of FIG. 3, system obfuscation module 48, as well as the other modules or components of obfuscation system 12, may leverage the SLURM plugin architecture to modify various functionality of SLURM within HPC cluster 10. System obfuscation module 48 may support many different obfuscation techniques, and, in some cases, may changes the behavior of task scheduling, interconnection fabric, resource selection, logging, and/or authentication (e.g., for SLURM) to behave in unpredictable ways by, e.g., masking metadata that may compromise the security of the user or of HPC cluster 10 in general. By providing an intermediate control source, system obfuscation module 48, and obfuscation modules 44 in general, may gain granular control over daemons or processes executed by master node 16 and/or compute nodes 18, the interactions between such daemons or processes, and how resources are allocated in HPC cluster 10, because obfuscation modules 44 may serve as an intermediate redirection layer between master node 16 and compute nodes 18.

By redirecting resource allocation tasks back through obfuscation modules 44, including system obfuscation module 48, it becomes possible to implement various management techniques (e.g., randomization techniques) on compute resources such as compute nodes 18, as described in more detail below.

As one non-limiting example, system obfuscation module 48 may, based on one or more of obfuscation policies 42, implement an obfuscation technique for randomized task scheduling of tasks that are performed by compute nodes 18. Task scheduling is generally understood as the act of determining an order of resource allocation (e.g., allocation of compute nodes 18) for task execution. Without the use of system obfuscation module 48, a task scheduler (e.g., master node 16) may use a backfill algorithm that determines resource allocation based on task priorities. However, one security-relevant limitation of such a backfill algorithm is predictability. A backfill algorithm may also require master node 16 to consider all other running jobs or tasks in order to assign resources, which may add computational overhead to the process.

Through the use of system obfuscation module 48, however, which serves as an intermediate redirection layer between master node 16 and compute nodes 18, HPC cluster 10 may implement a randomized scheduler that is less predictable and that potentially does not add as much computational overhead. Users may be unable to anticipate which resources will be allocated to which job or task, preserving computational integrity. By using a random scheduler, system obfuscation module 48 may reduce computational overhead while maintaining comparable utilization to the backfill algorithm for scheduling tasks. System obfuscation module 48 may not necessarily account for task prioritization or all other running jobs in HPC cluster 10 in order to implement task randomization. Instead, system obfuscation module 48 may utilize obfuscation policies 42 to determine one or more randomization algorithms to use in scheduling tasks for execution by allocated ones of compute nodes 18. For example, each time system obfuscation module 48 needs to allocate one of compute nodes 18 for performing a job or task (or a portion thereof), system obfuscation module 48 may randomly select one of compute nodes 18 independent of job or task priority, making the behavior of HPC cluster 10, and task scheduling more generally, less predictable. In effect, by implementing randomization, system obfuscation module 48 may obfuscate the process that is used by HPC cluster 10 for task scheduling and/or resource allocation. System obfuscation module 48 may further obfuscate the task scheduling process, in some cases, by randomizing or otherwise altering (e.g., based on one or more of obfuscation policies 42) the time scheduling of tasks that is otherwise typically performed by master node 16, which may make the process further obfuscated to a user that may attempt to snoop into the activities of HPC cluster 10.

In other non-limiting examples, system obfuscation module 48 may utilize obfuscation policies 42 to determine other algorithms, separate from randomization algorithms, to use in scheduling tasks for execution by allocated ones of compute nodes 18. For example, each time system obfuscation module 48 needs to allocate one of compute nodes 18 for performing a job or task (or a portion thereof), system obfuscation module 48 may select one of compute nodes 18 by taking into account the current availability and/or utilization of each of compute nodes 18. For example, system obfuscation module 48 may implement one or more techniques to determine which of compute nodes 18 have current availability and/or bandwidth for task processing, and may also, in some cases, determine which of compute nodes are currently underutilized within the set of compute nodes 18. Based on such determinations, system obfuscation module 48 may select a particular one of compute nodes 18 for task processing.

In addition to modifying functionality associated with task scheduling and/or resource allocation, system obfuscation module 48 may also provide system-level obfuscation functionality associated with networking, logging, and/or authentication. For example, with respect to networking, system obfuscation module 48 may obfuscate network traffic that is transmitted to or received by master node 16 and/or compute nodes 18. By obfuscating network packets, a user or other entity attempting to snoop into the data flow of HPC cluster 10 may have a much more difficult time trying to discover the content (e.g., encrypted content) or originators (e.g., originating sources) of the packets. In some cases, system obfuscation module 48 may use one or more encryption algorithms specified by obfuscation policies 42 to obfuscate or deobfuscate network traffic that flows in HPC cluster 10.

System obfuscation module 48 may also obfuscate (e.g., encrypt) logging data that is processed or stored by HPC cluster 10, making it more difficult for a user to discern the functionality of HPC cluster 10 based on the content of log data or messages. In many cases, log data may provide a glimpse into various operations that are performed by HPC cluster 10, or into the general state of HPC cluster 10. However, by obfuscating such log data, system obfuscation module 48 may add another layer of obfuscation and unintelligibility and/or unpredictability into the system. In some examples, system obfuscation module 48 may also obfuscate authentication data or procedures used by HPC cluster 10. For example, system obfuscation module 48 may alter the process that is used for user authentication on HPC cluster 10. In some cases, system obfuscation module 48 may obfuscate the authentication data that is used or stored by HPC cluster 10, such that an unauthorized or unprivileged user may have much more difficulty in gleaning information about the authentication process or stored records.

In addition, system obfuscation module 48 may obfuscate configuration information that is transmitted or otherwise processed in HPC cluster 10. In various cases, obfuscation system 12 and/or master node 16 may configure one or more of compute nodes 18 (e.g., during initialization or at runtime). For example, obfuscation system 12 and/or master node 16 may configure one or more of resources provided by compute nodes 18 that are to be used in task execution. System obfuscation module 48 may be configured to obfuscate such configuration operations in setting up and managing compute nodes 18. In addition, obfuscation system 12 may obfuscate (e.g., encrypt) any configuration data that is exchanged with master node 16 and/or compute nodes 18 as part of the configuration process.

As described previously, obfuscation policies 42 may be fully or at least partially customizable. Thus, obfuscation system 12 may change (e.g., based on user/administrator input) a first group of obfuscation policies 42 that are used by code obfuscation module 46 and system obfuscation module 48 over time. For example, at any point in time, a user may customize obfuscation policies 42 to alter the way in which code obfuscation module 46 obfuscates or deobfuscates commands or associated data. Prior to such customization, obfuscation system 12 may have obfuscated data associated with incoming commands received from command module 40 based on a first group of obfuscation policies 42 in order to generate obfuscated commands that are sent to master node 16 and/or compute nodes 18. However, upon user customization of the first group of obfuscation policies 42, obfuscation system 12 may subsequently obfuscate data associated with new incoming commands received from command module 40 based on the first modified group of obfuscation policies 42, which may alter the way in which obfuscation system 12 obfuscates command data that is sent to master node 16 and/or compute nodes 18, introducing a level of change and/or unpredictability into HPC cluster 10.

Similarly, a user may customize a second group of obfuscation policies 42 to alter the way in which system obfuscation module 48 obfuscates task scheduling, resource allocation, logging, networking, and/or authentication in HPC cluster 10. By customizing or changing obfuscation policies 42 over time, obfuscation system 12 introduces even more change and/or unpredictability into HPC cluster 10, making it difficult for users to gain insight into any specific or unchanging obfuscation techniques that may be used.

Figure 4:
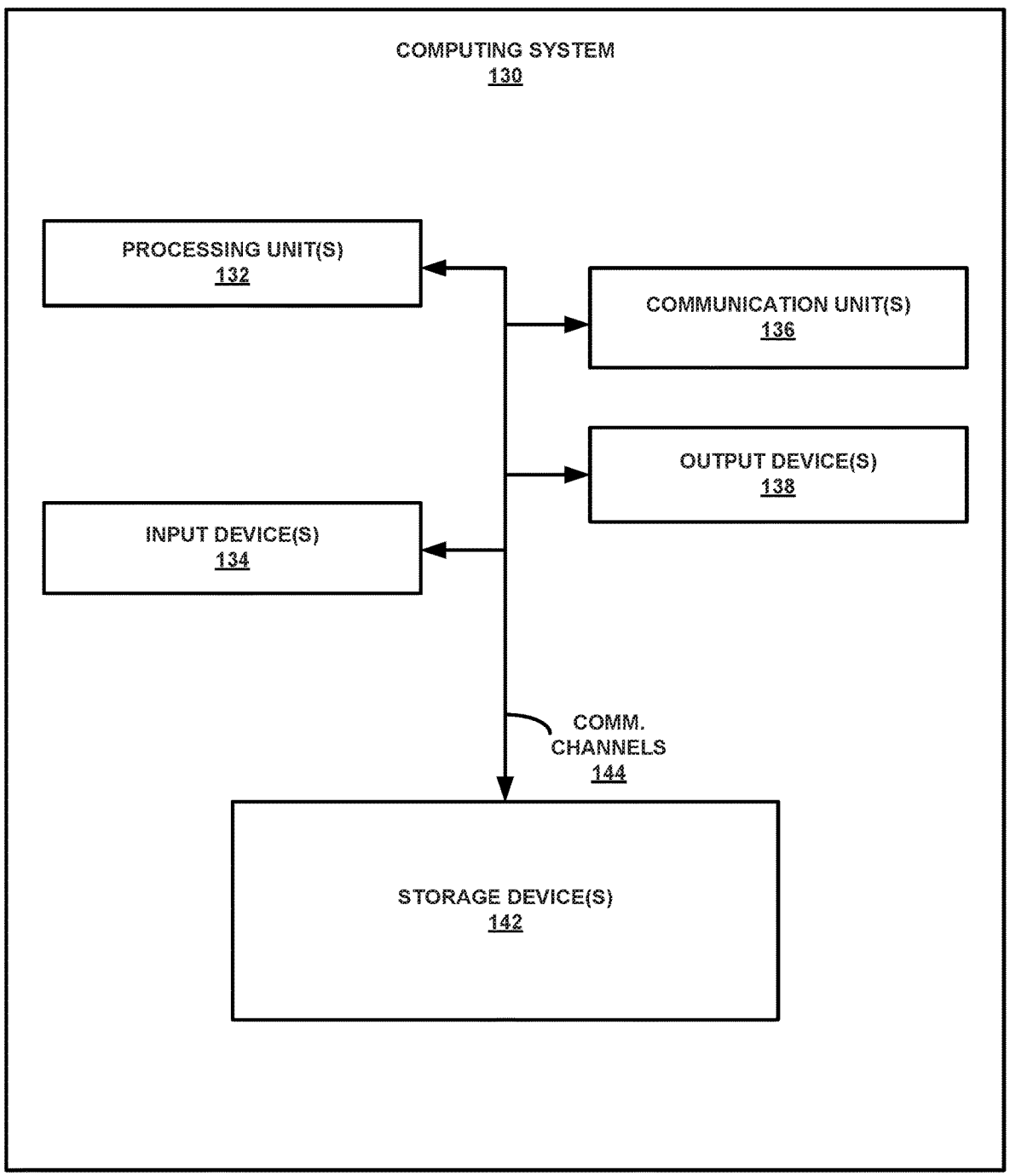
FIG. 4 is a block diagram illustrating further details of an example computing system, such as one or more of the computing systems shown in FIGS. 1-3, in accordance with one or more aspects of the present disclosure.

FIG. 4 is a block diagram illustrating further details of an example computing system 130, such as one or more of the computing systems shown in FIGS. 1-3, in accordance with one or more aspects of the present disclosure. For example, computing system 13 may be an example of one of user computing systems 4, an example of obfuscation system 12 in computing platform 10, and/or obfuscation system 22 in computing platform 20. FIG. 4 illustrates only one particular example of computing system 130, and many other examples of computing system 130 may be used in other instances and may include a subset of the components shown, or may include additional components not shown, in FIG. 4.

As shown in the example of FIG. 4, computing system 130 includes one or more processing units 132, one or more input devices 134, one or more communication units 136, one or more output devices 138, and one or more storage devices 142. In some examples, computing system 120 may not include input devices 134 and/or output devices 138. Communication channels 144 may interconnect each of the components 132, 134, 136, 138, and 142 for inter-component communications (physically, communicatively, and/or operatively). In some examples, communication channels 144 may include a system bus, a network connection, an inter-process communication data structure, or any other method for communicating data between hardware and/or software.

One or more input devices 134 of computing system 130 may receive input. Examples of input are tactile, audio, and video input. Examples of input devices 134 include a presence-sensitive screen, touch-sensitive screen, mouse, keyboard, voice responsive system, video camera, microphone or any other type of device for detecting input from a human or machine.

One or more output devices 138 of computing system 130 may generate output. Examples of output are tactile, audio, and video output. Examples of output devices 138 include a presence-sensitive screen, sound card, video graphics adapter card, speaker, cathode ray tube (CRT) monitor, liquid crystal display (LCD), or any other type of device for generating output to a human or machine. Output devices 138 may include display devices such as cathode ray tube (CRT) monitor, liquid crystal display (LCD), or any other type of device for generating tactile, audio, and/or visual output.

One or more communication units 136 of computing system 130 may communicate with one or more other computing systems or devices via one or more networks by transmitting and/or receiving network signals on the one or more networks. Examples of communication units 136 include a network interface card (e.g. such as an Ethernet card), an optical transceiver, a radio frequency transceiver, or any other type of device that can send and/or receive information, such as through a wired or wireless network. Other examples of communication units 136 may include short wave radios, cellular data radios, wireless Ethernet network radios, as well as universal serial bus (USB) controllers. Communication units 136 may provide wired and/or wireless communication.

One or more storage devices 142 within computing system 130 may store information for processing during operation of computing system 130 (e.g., computing system 130 may store data accessed by one or more modules, processes, applications, or the like during execution at computing system 130). In some examples, storage devices 142 on computing system 130 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 142, in some examples, also include one or more computer-readable storage media. Storage devices 142 may be configured to store larger amounts of information than volatile memory. Storage devices 142 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 142 may store program instructions and/or data associated with one or more software/firmware elements or modules.

For example, when computing system 130 comprises an example of obfuscation system 12 shown in FIG. 2, storage devices 142 may store obfuscation policies 42. In addition, storage devices 142 may store instructions and/or data associated with command module 40, monitoring module 41, and obfuscation modules 44 shown in FIG. 2.

Storage devices 142 also stores instructions and/or data associated with an operating system, which may be used by computing system 130 during operation. As described herein, computing system 130 may utilize one or more different operating systems (e.g., FreeBSD, Linux).

Computing system 130 further includes one or more processing units 132 that may implement functionality and/or execute instructions within computing system 130. For example, processing units 132 may receive and execute instructions stored by storage devices 142 that execute the functionality of the elements and/or modules described herein. These instructions executed by processing units 132 may cause computing system 130 to store information within storage devices 142 during program execution. Processing units 132 may also execute instructions of the operating system to perform one or more operations described herein.

Figure 5:
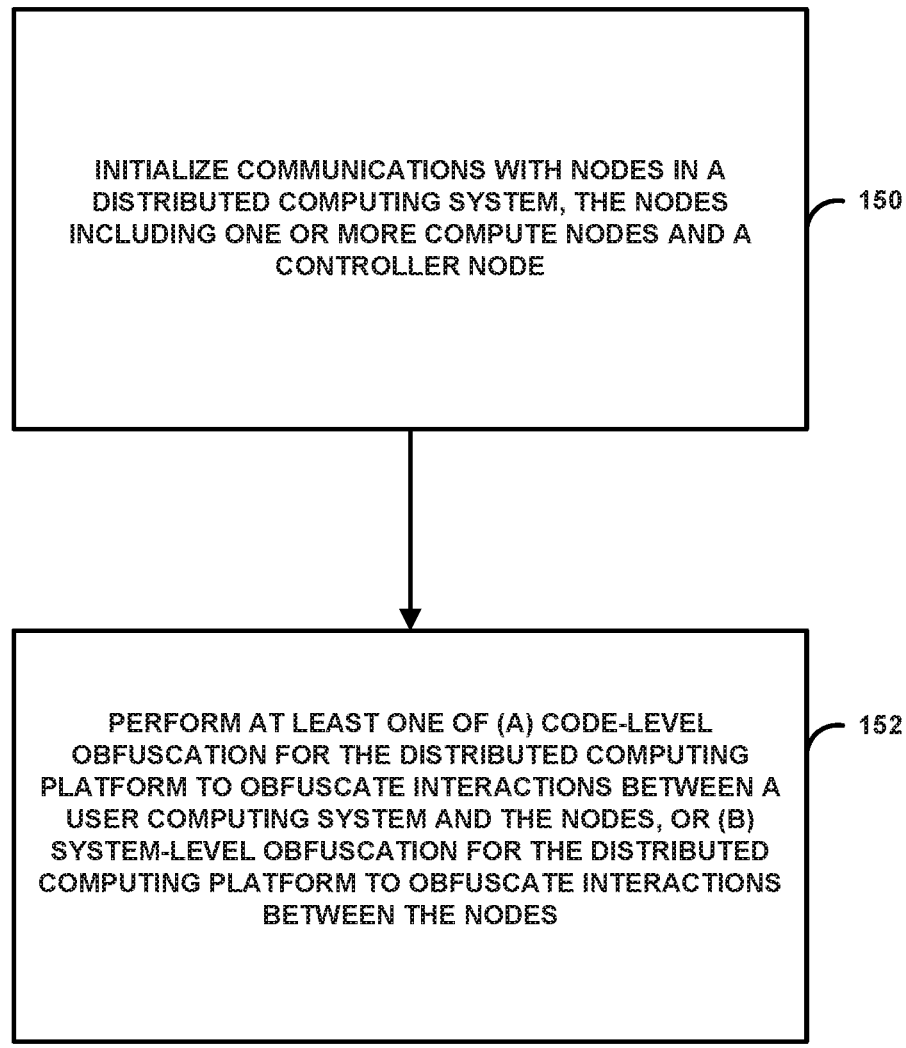
FIG. 5 is a flow diagram illustrating an example process that may be performed by a computing system, such as one or more of the computing systems shown in FIGS. 1-4, in accordance with one or more aspects of the present disclosure.

FIG. 5 is a flow diagram illustrating an example process that may be performed by a computing system, such as one or more of the computing systems shown in FIGS. 1-4, in accordance with one or more aspects of the present disclosure. For example, the process illustrated in FIG. 5, which comprises one or more operations, may be performed by obfuscation system 12.

As illustrated in FIG. 5, the process includes initializing (150), by an obfuscation computing system (e.g., obfuscation computing system 12), communications with a plurality of nodes (e.g., nodes 16, 18) in a distributed computing platform (e.g., distributed computing platform 10). The nodes include one or more compute nodes (e.g., compute nodes 18) that provide one or more resources in the distributed computing platform, and the nodes further include a controller node (e.g., controller node 16) that performs resource management of the one or more resources in the distributed computing platform. The obfuscation computing system serves as an intermediary between the controller node and the one or more compute nodes.

The process of FIG. 5 further includes performing (152), by the obfuscation computing system, at least one of (a) code-level obfuscation for the distributed computing platform to obfuscate interactions between a user computing system (e.g., one of user computing systems 4) and the nodes, or (b) system-level obfuscation for the distributed computing platform. As such, obfuscation computing system may perform code-level obfuscation and/or system-level obfuscation. Performing the code-level obfuscation may include obfuscating data associated with one or more commands provided by the user computing system to generate one or more obfuscated commands, and sending the one or more obfuscated commands to at least one of the nodes in the distributed computing platform. Performing the system-level obfuscation may include obfuscating system management tasks that are performed to manage the nodes and/or obfuscating network traffic data that is exchanged between the nodes. In some examples, the obfuscation computing system performs both the code-level obfuscation and the system-level obfuscation for the distributed computing platform.

Performing at least one of the code-level obfuscation or the system-level obfuscation may include performing, by the obfuscation computing system, at least the system-level obfuscation for the distributed computing platform. Obfuscating the system management tasks that are performed to manage the plurality of nodes may include obfuscating one or more configuration tasks that are performed to configure at least one of the one or more compute nodes. Performing the system-level obfuscation may include at least obfuscating the system management tasks that are performed to manage the plurality of nodes. Obfuscating the system management tasks that are performed to manage the plurality of nodes may include obfuscating at least one of: selection of the one or more compute nodes to perform tasks in the distributed computing platform, scheduling of the tasks performed by the one or more compute nodes, configuration of the one or more compute nodes, logging of information associated with the tasks performed by the one or more compute nodes, or authentication of users in the distributed computing platform. Obfuscating the selection of the one or more compute nodes to perform the tasks in the distributed computing platform may include performing a randomized selection of at least one of the one or more compute nodes to perform at least one of the tasks.

In some examples, performing at least one of the code-level obfuscation or the system-level obfuscation may include performing, by the obfuscation computing system, at least the code-level obfuscation for the distributed computing platform. Obfuscating the data associated with the one or more commands provided by the user computing system may include obfuscating command input data associated with the one or more commands provided by the user computing system to generate the one or more obfuscated commands, the one or more obfuscated commands including the obfuscated command input data. Obfuscating the command input data to generate the one or more obfuscated commands may include performing a homomorphic encryption operation to transform the command input data into the obfuscated command input data that is included in the one or more obfuscated commands. Performing the code-level obfuscation may further include receiving, by the obfuscation computing system and from the at least one of the plurality of nodes, obfuscated response data that is responsive to the one or more obfuscated commands. Performing the code-level obfuscation may further include deobfuscating, by the obfuscation computing system, the obfuscated response data to generate deobfuscated response data, and sending, by the obfuscating computing system and to the user computing system, the deobfuscated response data. The obfuscated response data may include output data associated with execution of the one or more obfuscated commands, and deobfuscating the obfuscated response data may include deobfuscating, by the obfuscation computing system, the output data included in the obfuscated response data to generate the deobfuscated response data.

In some examples, performing at least one of the code-level obfuscation or the system-level obfuscation may include performing, by the obfuscation computing system, at least the system-level obfuscation for the distributed computing platform, and performing the system-level obfuscation may include at least obfuscating the network traffic data that is exchanged between the plurality of nodes. Obfuscating the network traffic data that is exchanged between the plurality of nodes may include at least one of obfuscating an originating source of the network traffic data or encrypting content of the network traffic data. Obfuscating the data associated with the one or more commands to generate the one or more obfuscated commands may be based on a first group of customizable obfuscation policies stored by the obfuscation computing system, and performing the system-level obfuscation may be based on a second group of customizable obfuscation policies stored by the obfuscation computing system, the second group of customizable obfuscation policies being different from the first group of customizable obfuscation policies.

Performing at least one of the code-level obfuscation or the system-level obfuscation may include performing, by the obfuscation computing system, at least the code-level obfuscation for the distributed computing platform. Performing the code-level obfuscation may further include: obfuscating, by the obfuscation computing system, and based on an obfuscation policy included in the first group of customizable obfuscation policies, first data associated with a first command provided by the user computing system to generate a first obfuscated command; sending, by the obfuscation computing system, the first obfuscated command to the at least one of the plurality of nodes; receiving, by the obfuscation computing system, a modification to the obfuscation policy to generate a modified obfuscation policy; obfuscating, by the obfuscation computing system, and based on the modified obfuscation policy, second data associated with a second command provided by the user computing system to generate a second obfuscated command; and sending, by the obfuscation computing system, the second obfuscated command to the at least one of the plurality of nodes.

Performing at least one of the code-level obfuscation or the system-level obfuscation may include performing, by the obfuscation computing system, at least the system-level obfuscation for the distributed computing platform. The second group of customizable obfuscation policies may include policies associated with at least one of: selection of the one or more compute nodes to perform tasks in the distributed computing platform, scheduling of the tasks performed by the one or more compute nodes, configuration of the one or more compute nodes, logging of information associated with the tasks performed by the one or more compute nodes, authentication of users in the distributed computing platform, or transmission of network data in the distributed computing platform.

In some examples, the distributed computing platform comprises a distributed high-performance computing cluster. The user computing system may, in some cases, be external to the distributed computing platform.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise random-access memory (RAM), read-only memory (ROM), electrically programmable memory (EPROM), electrically erasable and programmable memory (EEPROM), compact-disc ROM (CD-ROM), or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSP's), general purpose microprocessors, application specific integrated circuits (ASIC's), field programmable logic arrays (FPGA's), or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of IC's (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:
1. A method comprising:
   initializing, by an obfuscation computing system, communications with a plurality of nodes in a distributed computing platform, wherein the plurality of nodes includes one or more compute nodes that provide one or more resources in the distributed computing platform, wherein the plurality of nodes further includes a controller node that performs resource management of the one or more resources in the distributed computing platform, and wherein the obfuscation computing system serves as an intermediary between the controller node and the one or more compute nodes; and
   performing, by the obfuscation computing system, at least one of:
   (a) code-level obfuscation for the distributed computing platform to obfuscate interactions between a user computing system and the plurality of nodes, wherein performing the code-level obfuscation comprises:
     obfuscating, based on a first group of customizable obfuscation policies stored by the obfuscation computing system, data associated with one or more commands provided by the user computing system to generate one or more obfuscated commands; and sending the one or more obfuscated commands to at least one of the plurality of nodes in the distributed computing platform; or (b) system-level obfuscation for the distributed computing platform, wherein performing the system-level obfuscation comprises performing, based on a second group of customizable obfuscation policies stored by the obfuscation computing system, at least one of obfuscating system management tasks that are performed to manage the plurality of nodes or obfuscating network traffic data that is exchanged between the plurality of nodes, wherein the second group of customizable obfuscation policies is different from the first group of customizable obfuscation policies.

2. The method of claim 1, wherein performing at least one of the code-level obfuscation or the system-level obfuscation comprises performing, by the obfuscation computing system, the code-level obfuscation and the system-level obfuscation for the distributed computing platform.

3. The method of claim 1,
wherein performing at least one of the code-level obfuscation or the system-level obfuscation comprises performing, by the obfuscation computing system, at least the system-level obfuscation for the distributed computing platform, and
wherein obfuscating the system management tasks that are performed to manage the plurality of nodes comprises obfuscating one or more configuration tasks that are performed to configure at least one of the one or more compute nodes.

4. The method of claim 1,
wherein performing at least one of the code-level obfuscation or the system-level obfuscation comprises performing, by the obfuscation computing system, at least the system-level obfuscation for the distributed computing platform,
wherein performing the system-level obfuscation comprises at least obfuscating the system management tasks that are performed to manage the plurality of nodes, and
wherein obfuscating the system management tasks that are performed to manage the plurality of nodes comprises obfuscating at least one of: selection of the one or more compute nodes to perform tasks in the distributed computing platform, scheduling of the tasks performed by the one or more compute nodes, configuration of the one or more compute nodes, logging of information associated with the tasks performed by the one or more compute nodes, or authentication of users in the distributed computing platform.

5. The method of claim 4, wherein obfuscating the selection of the one or more compute nodes to perform the tasks in the distributed computing platform comprises performing a randomized selection of at least one of the one or more compute nodes to perform at least one of the tasks.

6. The method of claim 1,
wherein performing at least one of the code-level obfuscation or the system-level obfuscation comprises performing, by the obfuscation computing system, at least the code-level obfuscation for the distributed computing platform, and
wherein obfuscating the data associated with the one or more commands provided by the user computing system comprises obfuscating command input data associated with the one or more commands provided by the user computing system to generate the one or more obfuscated commands, the one or more obfuscated commands including the obfuscated command input data.

7. The method of claim 6, wherein obfuscating the command input data to generate the one or more obfuscated commands comprises performing a homomorphic encryption operation to transform the command input data into the obfuscated command input data that is included in the one or more obfuscated commands.

8. The method of claim 6, wherein performing the code-level obfuscation further comprises:
receiving, by the obfuscation computing system and from the at least one of the plurality of nodes, obfuscated response data that is responsive to the one or more obfuscated commands.

9. The method of claim 8, wherein performing the code-level obfuscation further comprises:
deobfuscating, by the obfuscation computing system, the obfuscated response data to generate deobfuscated response data; and
sending, by the obfuscating computing system and to the user computing system, the deobfuscated response data.

10. The method of claim 9,
wherein the obfuscated response data includes output data associated with execution of the one or more obfuscated commands, and
wherein deobfuscating the obfuscated response data comprises deobfuscating, by the obfuscation computing system, the output data included in the obfuscated response data to generate the deobfuscated response data.

11. The method of claim 1,
wherein performing at least one of the code-level obfuscation or the system-level obfuscation comprises performing, by the obfuscation computing system, at least the system-level obfuscation for the distributed computing platform,
wherein performing the system-level obfuscation comprises at least obfuscating the network traffic data that is exchanged between the plurality of nodes, and
wherein obfuscating the network traffic data that is exchanged between the plurality of nodes comprises at least one of obfuscating an originating source of the network traffic data or encrypting content of the network traffic data.

12. The method of claim 1, wherein performing at least one of the code-level obfuscation or the system-level obfuscation comprises performing, by the obfuscation computing system, at least the code-level obfuscation for the distributed computing platform, and wherein performing the code-level obfuscation further comprises:
obfuscating, by the obfuscation computing system, and based on an obfuscation policy included in the first group of customizable obfuscation policies, first data associated with a first command provided by the user computing system to generate a first obfuscated command;
sending, by the obfuscation computing system, the first obfuscated command to the at least one of the plurality of nodes;
receiving, by the obfuscation computing system, a modification to the obfuscation policy to generate a modified obfuscation policy;

obfuscating, by the obfuscation computing system, and based on the modified obfuscation policy, second data associated with a second command provided by the user computing system to generate a second obfuscated command; and sending, by the obfuscation computing system, the second obfuscated command to the at least one of the plurality of nodes.

13. The method of claim 1, wherein performing at least one of the code-level obfuscation or the system-level obfuscation comprises performing, by the obfuscation computing system, at least the system-level obfuscation for the distributed computing platform, and wherein the second group of customizable obfuscation policies includes policies associated with at least one of: selection of the one or more compute nodes to perform tasks in the distributed computing platform, scheduling of the tasks performed by the one or more compute nodes, configuration of the one or more compute nodes, logging of information associated with the tasks performed by the one or more compute nodes, authentication of users in the distributed computing platform, or transmission of network data in the distributed computing platform.

14. The method of claim 1, wherein the distributed computing platform comprises a distributed high-performance computing cluster.

15. The method of claim 1, wherein the user computing system is external to the distributed computing platform.

16. A computing system, comprising:

one or more processors; and one or more non-transitory computer-readable storage media storing instructions that, when executed, cause the one or more processors to:

initialize communications with a plurality of nodes in a distributed computing platform, wherein the plurality of nodes includes one or more compute nodes that provide one or more resources in the distributed computing platform, wherein the plurality of nodes further includes a controller node that performs resource management of the one or more resources in the distributed computing platform, and wherein the computing system serves as an intermediary between the controller node and the one or more compute nodes; and perform at least one of:

(a) code-level obfuscation for the distributed computing platform to obfuscate interactions between a user computing system and the plurality of nodes, wherein the user computing system is external to the distributed computing platform, wherein performing the code-level obfuscation comprises obfuscating based on a first group of customizable obfuscation policies stored by the obfuscation computing system, data associated with one or more commands provided by the user computing system to generate one or more obfuscated commands, and sending the one or more obfuscated commands to at least one of the plurality of nodes in the distributed computing platform; or (b) system-level obfuscation for the distributed computing platform, wherein performing the system-level obfuscation comprises performing, based on a second group of customizable obfuscation policies stored by the obfuscation computing system, at least one of obfuscating system management tasks that are performed to manage the plurality of nodes or obfuscating network traffic data that is exchanged between the plurality of nodes, wherein the second group of customizable obfuscation policies is different from the first group of customizable obfuscation policies.

17. The computing system of claim 16, wherein the instructions stored on the one or more non-transitory computer-readable storage media cause the one or more processors to perform the code-level obfuscation and the system-level obfuscation for the distributed computing platform.

18. The computing system of claim 16, wherein the instructions stored on the one or more non-transitory computer-readable storage media cause the one or more processors to perform at least the system-level obfuscation for the distributed computing platform, and wherein the instructions stored on the one or more non-transitory computer-readable storage media that cause the one or more processors to perform the system-level obfuscation further cause the one or more processors to at least obfuscate the system management tasks that are performed to manage the plurality of nodes by obfuscating at least one of: selection of the one or more compute nodes to perform tasks in the distributed computing platform, scheduling of the tasks performed by the one or more compute nodes, configuration of the one or more compute nodes, logging of information associated with the tasks performed by the one or more compute nodes, or authentication of users in the distributed computing platform.

19. The computing system of claim 16, wherein the instructions stored on the one or more non-transitory computer-readable storage media cause the one or more processors to perform at least the code-level obfuscation for the distributed computing platform, and wherein the instructions stored on the one or more non-transitory computer-readable storage media that cause the one or more processors to obfuscate the data associated with the one or more commands provided by the user computing system further cause the one or more processors to obfuscate command input data associated with the one or more commands provided by the user computing system to generate the one or more obfuscated commands, the one or more obfuscated commands including the obfuscated command input data.

20. The computing system of claim 19, wherein the instructions stored on the one or more non-transitory computer-readable storage media that cause the one or more processors to perform the code-level obfuscation further cause the one or more processors to receive, from the at least one of the plurality of nodes, obfuscated response data that is responsive to the one or more obfuscated commands.

21. The computing system of claim 20, wherein the instructions stored on the one or more non-transitory computer-readable storage media that cause the one or more processors to perform the code-level obfuscation further cause the one or more processors to:

deobfuscate the obfuscated response data to generate deobfuscated response data; and send, to the user computing system, the deobfuscated response data.

22. The computing system of claim 16,
wherein the instructions stored on the one or more non-transitory computer-readable storage media cause the one or more processors to perform at least the system-level obfuscation for the distributed computing platform, and
wherein the instructions stored on the one or more non-transitory computer-readable storage media that cause the one or more processors to perform the system-level obfuscation further cause the one or more processors to at least obfuscate the network traffic data that is exchanged between the plurality of nodes by at least one of obfuscating an originating source of the network traffic data or encrypting content of the network traffic data.

23. A non-transitory computer-readable storage medium storing instructions that, when executed, cause a computing system to perform operations comprising:
initializing communications with a plurality of nodes in a distributed computing platform, wherein the plurality of nodes includes one or more compute nodes that provide one or more resources in the distributed computing platform, wherein the plurality of nodes further includes a controller node that performs resource management of the one or more resources in the distributed computing platform, and wherein the computing system serves as an intermediary between the controller node and the one or more compute nodes; and
performing at least one of:
(a) code-level obfuscation for the distributed computing platform to obfuscate interactions between a user computing system and the plurality of nodes, wherein the user computing system is external to the distributed computing platform, wherein performing the code-level obfuscation comprises:
obfuscating, based on a first group of customizable obfuscation policies stored by the obfuscation computing system, data associated with one or more commands provided by the user computing system to generate one or more obfuscated commands; and
sending the one or more obfuscated commands to at least one of the plurality of nodes in the distributed computing platform; or
(b) system-level obfuscation for the distributed computing platform, wherein performing the system-level obfuscation comprises performing, based on a second group of customizable obfuscation policies stored by the obfuscation computing system, at least one of obfuscating system management tasks that are performed to manage the plurality of nodes or obfuscating network traffic data that is exchanged between the plurality of nodes, wherein the second group of customizable obfuscation policies is different from the first group of customizable obfuscation policies.

24. The non-transitory computer-readable storage medium of claim 23, wherein performing at least one of the code-level obfuscation or the system-level obfuscation comprises performing the code-level obfuscation and the system-level obfuscation for the distributed computing platform.

25. The non-transitory computer-readable storage medium of claim 23,
wherein performing at least one of the code-level obfuscation or the system-level obfuscation comprises performing at least the system-level obfuscation for the distributed computing platform,
wherein performing the system-level obfuscation comprises at least obfuscating the system management tasks that are performed to manage the plurality of nodes, and
wherein obfuscating the system management tasks that are performed to manage the plurality of nodes comprises obfuscating at least one of: selection of the one or more compute nodes to perform tasks in the distributed computing platform, scheduling of the tasks performed by the one or more compute nodes, configuration of the one or more compute nodes, logging of information associated with the tasks performed by the one or more compute nodes, or authentication of users in the distributed computing platform.

26. The non-transitory computer-readable storage medium of claim 23,
wherein performing at least one of the code-level obfuscation or the system-level obfuscation comprises performing at least the code-level obfuscation for the distributed computing platform, and
wherein obfuscating the data associated with the one or more commands provided by the user computing system comprises obfuscating command input data associated with the one or more commands provided by the user computing system to generate the one or more obfuscated commands, the one or more obfuscated commands including the obfuscated command input data.

27. The non-transitory computer-readable storage medium of claim 26, wherein performing the code-level obfuscation further comprises:
receiving, by the obfuscation computing system and from the at least one of the plurality of nodes, obfuscated response data that is responsive to the one or more obfuscated commands.

28. The non-transitory computer-readable storage medium of claim 27, wherein performing the code-level obfuscation further comprises:
deobfuscating, by the obfuscation computing system, the obfuscated response data to generate deobfuscated response data; and
sending, by the obfuscating computing system and to the user computing system, the deobfuscated response data.

* * * * *